(12) United States Patent
Gudipati et al.

(10) Patent No.: US 10,216,425 B1
(45) Date of Patent: Feb. 26, 2019

(54) TOPOLOGY AWARE LOAD OPTIMIZED MULTIPATH I/O SCHEDULER (71) Applicant: EMC IP Holding Company LLC, Hopkinton, MA (US)

(72) Inventors: Krishna Gudipati, Santa Clara, CA (US); Charles Hickey, Aptos, CA (US); Anil Ravindranath, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 87 days.

(21) Appl. No.: 15/282,568

(22) Filed: Sep. 30, 2016

(51) Int. Cl.
G06F 3/06 (2006.01)
G06F 13/42 (2006.01)

(52) U.S. Cl.
CPC ............ *G06F 3/0611* (2013.01); *G06F 3/067* (2013.01); *G06F 3/0655* (2013.01); *G06F 13/4282* (2013.01); *G06F 2213/0028* (2013.01)

(58) Field of Classification Search
CPC ........... G06F 9/4887; G06F 2209/5017; G06F 3/0635; G06F 9/4806; G06F 9/4881; G06F 9/5016; G06F 3/0611; G06F 3/067; G06F 3/0655; G06F 13/4282
See application file for complete search history.

(56) References Cited

U.S. PATENT DOCUMENTS

| | | | | |
|---|---|---|---|---|
| 9,760,297 | B2* | 9/2017 | Karr | G06F 3/0619 |
| 2009/0285098 | A1* | 11/2009 | Qi | H04L 45/24 |
| | | | | 370/235 |
| 2010/0082851 | A1* | 4/2010 | Green | G06F 9/4881 |
| | | | | 710/29 |
| 2014/0092809 | A1* | 4/2014 | Guo | H04W 40/12 |
| | | | | 370/328 |

* cited by examiner

Primary Examiner — Zhuo H Li
(74) Attorney, Agent, or Firm — Womble Bond Dickinson (US) LLP (57) ABSTRACT Described is a system (and technique) to determine an appropriate path to a storage device and scheduling a data transfer by taking into consideration bandwidth, device performance, and the nature of the transfer. The system may use an efficient implementation to reduce overhead when making such a determination by utilizing a reservation table and selecting a dispatch that is efficient for a particular data transfer. For example, the system may determine a first-fit and a future-fit scheduling for an I/O request for each path to a storage device. The system may determine completion times for each of the types of scheduling for each of the paths, and accordingly, select the path and schedule with the earliest completion time.

20 Claims, 7 Drawing Sheets

| # | Disk Index | IO Type | IO Size | IO Arrival Time | Disk Service Time | IO Start Transfer Time Estimate | First-fit Latency | Future-fit Latency | IO Completion Time Estimate |
|---|---|---|---|---|---|---|---|---|---|
| 1 | 0 | HDD-READ | 1MB | 1000 | 8ms | 1008ms | | | |
| 2 | 1 | HDD-READ | 1MB | 1000 | 8ms | 1008ms | | | |
| 3 | 2 | HDD-READ | 1MB | 1000 | 8ms | 1008ms | | | |
| 4 | 3 | HDD-READ | 1MB | 1000 | 8ms | 1008ms | | | |
| 5 | 4 | HDD-READ | 1MB | 1000 | 8ms | 1008ms | | | |
| 6 | 5 | HDD-READ | 1MB | 1000 | 8ms | 1008ms | | | |
| 7 | 0 | HDD-WRITE | 1MB | 1000 | 16ms | 1016ms | | | |
| 8 | 1 | HDD-WRITE | 1MB | 1000 | 16ms | 1016ms | | | |
| 9 | 2 | HDD-WRITE | 1MB | 1000 | 16ms | 1016ms | | | |
| 10 | 3 | HDD-WRITE | 1MB | 1000 | 16ms | 1016ms | | | |
| 11 | 4 | HDD-WRITE | 1MB | 1000 | 16ms | 1016ms | | | |
| 12 | 5 | HDD-WRITE | 1MB | 1000 | 16ms | 1016ms | | | |

FIG. 3

SAS Band Width Reservation Table Update

| # | IO Size | # BU's | ERA (54-Bit) | Time Slice Index (64-Bit) Original TS_INDEX | First-fit | | Best-fit | | IO Completion Time |
|---|---------|--------|--------------|---------------------------------------------|-----------|--------|----------|--------|--------------------|
|   |         |        |              |                                             | Start TS  | Length | Start TS | Length |                    |
| 1 | 1MB     | 100    | 0            | 1008                                        | 1008      | 0.5ms  | 1008     | 0.5ms  | 1008.5ms           |
| 2 | 1MB     | 100    | 0            | 1008                                        | 1008      | 1ms    | 1008     | 1ms    | 1009ms             |
| 3 | 1MB     | 100    | 0            | 1008                                        | 1008      | 1.25ms | 1009     | 0.5ms  | 1009.25ms          |
| 4 | 1MB     | 100    | 0            | 1008                                        |           |        |          |        |                    |
| 5 | 1MB     | 100    | 0            | 1008                                        |           |        |          |        |                    |

421 — First-fit
422 — Best-fit
423 — IO Completion Time

TABLE update with IO # 1 - Time Slice 1008

| 1 | 2 | -- | 1021 | 1022 | 1023 | 1024 |
|---|---|----|------|------|------|------|
| 0 | 0 | -- | 1008 | 199  | 200  | 299  |

Time Slice 1008 BU's Update - IO #1

| 0 | 1 | -- | 99 | 100 | 199 | 200 | 299 |
|---|---|----|----|-----|-----|-----|-----|

TABLE update with IO # 2 - Time Slice 1008

| 1 | 2 | -- | 1022 | 1023 | 1024 |
|---|---|----|------|------|------|
| 0 | 0 | -- | 199  | 200  | 299  |

Time Slice 1008 BU's Update - IO #2

| 0 | 1 | -- | 99 | 100 | 199 | 200 | 299 |
|---|---|----|----|-----|-----|-----|-----|

IO # 3 - First-fit case:

TABLE update with IO # 3 - Time Slice 1008

| 1 | 2 | -- | 1022 | 1023 | 1024 |
|---|---|----|------|------|------|
| 0 | 1009 | -- | 299 | 200 | 299 |

Time Slice 1008 BU's Update - IO #3

| 0 | 1 | -- | 99 | 100 | 199 | 200 | 299 |
|---|---|----|----|-----|-----|-----|-----|

IO # 3 - Best-fit case:

TABLE update with IO # 3 - Time Slice 1008

| 1 | 2 | -- | 1022 | 1023 | 1024 |
|---|---|----|------|------|------|
| 0 | 1009 | -- | 1008 | 1023 | 1024 |

Time Slice 1009 BU's Update - IO #3

| 0 | 1 | -- | 59 | 60 | 199 | 200 | 299 |
|---|---|----|----|----|-----|-----|-----|

SAS Band Width Reservation Table Update -- Spanning Next Table

| # | IO Size | # BU's | Time Slice Index (64-Bit) | | First-fit | | Best-fit | | IO Completion Time |
|---|---------|--------|---------------------------|--|-----------|--|----------|--|---------------------|
| | | | ERA (54-Bit) | Original TS_INDEX | Start TS | Length | Start TS | Length | |
| 1 | 1MB | 100 | 0 | 1024 | 1024 | 0.5ms | 1024 | 0.5ms | 1024.5ms |
| 2 | 1MB | 100 | 0 | 1024 | 1024 | 1ms | 1024 | 1ms | 1025ms |
| 3 | 1MB | 100 | 0 | 1024 | 1024 (ERA 1) | 1.25ms | ERA 1 - 1 | 0.5ms | 1025.25ms |
| 4 | 1MB | 100 | 0 | 1024 | | | | | |
| 5 | 1MB | 100 | 0 | 1024 | | | | | |

421 — First-fit
422 — Best-fit
423 — IO Completion Time

Time Slice 1024 BU's Update - IO #1
Time Slice 1024 BU's Update - IO #2
Time Slice 1024 BU's Update - IO #3
ERA 1 & Time Slice 1 BU's Update - IO #3
Time Slice 1024 BU's Update - IO #3
ERA 1 & Time Slice 1 BU's Update - IO #3

IO #3 - First-fit case:
TABLE update with IO #3 - Time Slice 1024
NEXT TABLE update with IO #3 - ERA 1 & Time Slice 1

IO #3 - Best-fit case:
TABLE update with IO #3 - Time Slice 1024
NEXT TABLE update with IO #3 - ERA 1 & Time Slice 1

TOPOLOGY AWARE LOAD OPTIMIZED MULTIPATH I/O SCHEDULER

TECHNICAL FIELD

This disclosure relates generally to the field of storage systems. More specifically, this disclosure relates to determining efficient parameters for a data transfer to storage devices within a storage system.

BACKGROUND

Various protocols exist for data transfers within a storage environment. One such protocol is Serial Attached SCSI (SAS), which is a point-to-point serial protocol that is an update to the previous Parallel SCSI (Small Computer System Interface) bus technology. SAS is standardized to include bus speeds identified as SAS1, SAS2, and SAS3, which have a speed per "lane" of 3 Gb, 6 Gb, and 12 Gb respectively, and thus, provide an approximate throughput of 300 MB/sec, 600 MB/sec, and 1200 MB/sec respectively. Accordingly, it would take two devices performing transfers concurrently at approximately 150 MB/sec to saturate the bandwidth of a single SAS1 lane. Although SAS provides multiple paths with multiple lanes to a storage device to increase bandwidth, system configurations often include multiples groups of storage devices that are daisy-chained together, and accordingly, such bandwidth may become a critical resource in such configurations.

Despite bandwidth being a critical resource, traditional SAS systems often rely on static path assignments when transferring data to storage devices. In traditional configurations, these assignments are typically defined during boot-up and updated only in response to a detected failure. Accordingly, such systems do not contemplate using a less congested path at run-time, which invariably results in underutilization of bandwidth as one path may remain idle while another path is saturated. Moreover, in order to minimize processing, traditional SAS systems often do not perform any scheduling of data transfers. Instead, transfer requests are simply stacked until a threshold number is reached without regard to the size of each transfer. Accordingly, a mere 1-sector (e.g. 512 bytes) request is treated in a similar manner as, for example, a considerably larger half-megabyte request (e.g. 500 Kb). Accordingly, traditional SAS storage configurations often suffer from inefficiencies with respect to bus allocations.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

The following description and drawings are illustrative and are not to be construed as limiting. Numerous specific details are described to provide a thorough understanding of various embodiments. However, in certain instances, well-known or conventional details are not described in order to provide a concise discussion of embodiments. Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

As described above, there is a need to efficiently manage the data flow through interconnects of a storage system. Two primary factors often affect storage device performance: 1) latency; and 2) bandwidth. As referred to herein, latency may include the delay between a storage device receiving a request and the start of an actual transfer. As referred to herein, bandwidth may include the available rate of transferring data via a particular path to a particular storage device. Generally, bandwidth is intended to be constant (e.g. on an SAS bus); however, variations in packet sizes, buffering effects, location (e.g. within an SAS chain), and contention for a data path (e.g. SAS bus), often result in variances in bandwidth for paths to a storage device.

Latency and bandwidth are often contingent upon the type of storage device and the nature of the I/O request. For example, the variation in latency and bandwidth between storage devices and I/O requests can be significant. For example, Table 1 summarizes differences between device types using a hard-disk drive (HDDs) and a solid-state drive (SSD) as examples.

TABLE 1

Bandwidth and Latency Characteristics of HDD and SDD Drives

| Latency | Low Bandwidth | High Bandwidth |
|---|---|---|
| Low | SSD Writes | HDD Sequential/SSD Reads |
| High | HDD Random Small | HDD Random Large |

For example, individual transfers to SSDs can occur in less than 100 microseconds whereas similar transfers to HDDs can take as much as 1000 times longer. HDDs can, however, provide sub-millisecond latencies when performing sequential operations, and thus, the nature of the request becomes an important consideration.

In addition to the type of storage devices used, the configuration, for example, such as RAID presents its own set of challenges that both conflict and complement the performance characteristics of particular storage devices (e.g. HDD vs. SSD). For example, full-stripe operations on RAID may consume significant bandwidth (e.g. 4.5 MB), whereas random-read operations, which are frequent in some configurations, are minor in comparison (e.g. 64K or less) and only to a single drive.

Accordingly, to address the above noted inefficiencies within a storage system (e.g. SAS system), in one embodiment, described is a system (and technique) that determines an appropriate path to a storage device and an appropriate schedule for a data transfer by considering bandwidth, device performance, and the nature of the request. In addition, the system may provide such techniques using an efficient implementation to reduce overhead when making such a determination. For example, storage environments may require hundreds of thousands of such decisions to be made per second. Thus, the system may provide an efficient determination by utilizing a reservation table and selecting a dispatch that is efficient for a particular data transfer. For example, the system may determine a first-fit and a future-fit scheduling for an I/O request for multiple paths to a storage device. The system may determine a completion time for each of the types of scheduling and for each of the paths. Based on such a determination, the system may select the path having an available scheduling with the earliest completion time. Moreover, the system may efficiently implement a reservation table as further described herein to minimize the additional processing thereby avoiding the possibility of negating any performance benefits with the additional processing overhead. As further described herein, such a system and technique may be provided within an operation environment.

Figure 1:
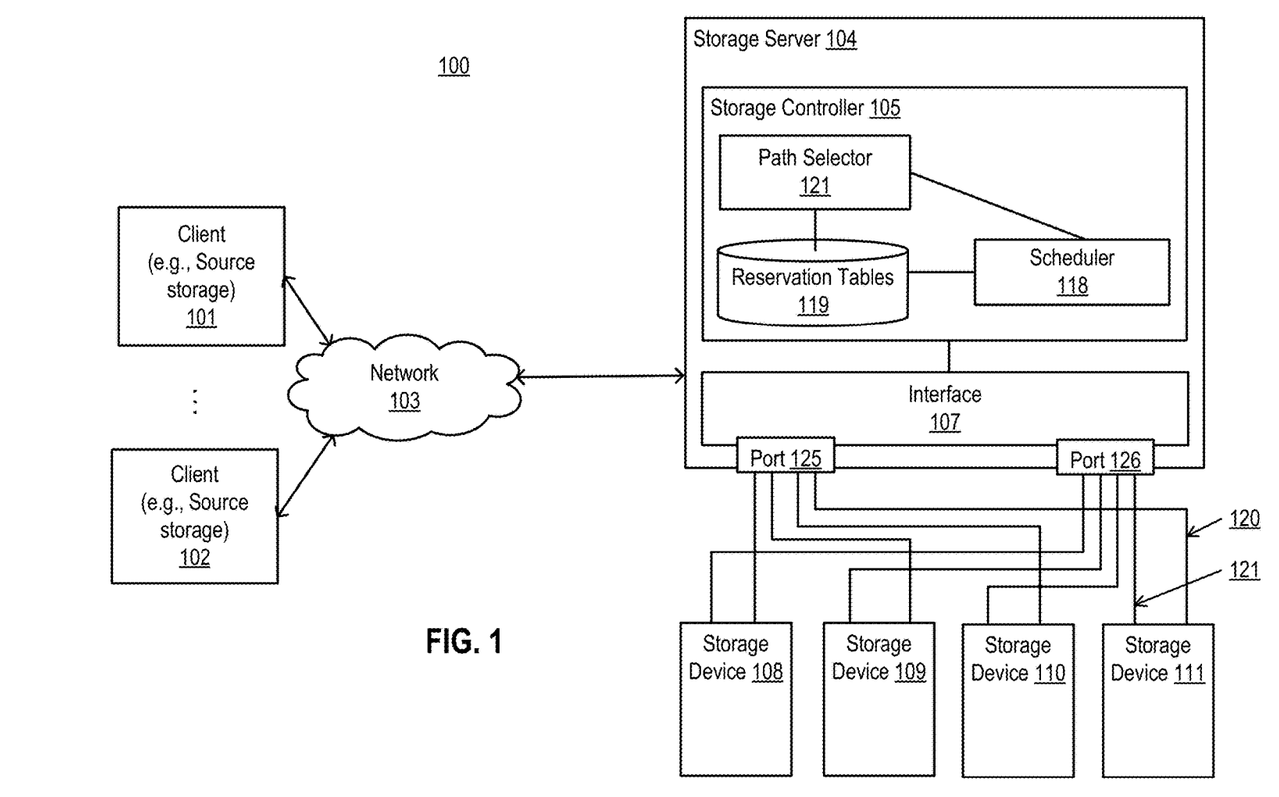
FIG. 1 is a block diagram illustrating an example operating environment according to an embodiment of the disclosure.

FIG. 1 is a block diagram illustrating an example operating environment according to an embodiment of the disclosure. As shown, system 100 includes, but is not limited to, one or more client systems 101-102 communicatively coupled to storage server 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of wired and/or wireless network such as a local area network (LAN), a wide area network (WAN) such as Internet, a storage area network (SAN), a bus, or a combination thereof.

Storage server 104 may include any type of server or cluster of servers, such as storage systems available from EMC® Corporation of Hopkinton, Mass. For example, storage server 104 may be a storage server used for any of various different purposes, such as to provide multiple users with access to shared data and/or to back up mission critical data. Storage server 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage server 104 may have a distributed architecture, or all of its components may be integrated into a single unit. Storage server 104 may be implemented as part of an archive and/or backup system such as a deduplicating storage system available from EMC® Corporation of Hopkinton, Mass.

The storage server 104 may include a storage controller 105. The storage controller 105 may include a scheduler 118, a path selector 121, and may access one or more reservations tables 119, which may be, part of, or separate from the storage controller 105. As further described herein, a scheduler 118 may determine various timings for a data transfer including a first-fit schedule and future-fit schedule by accessing and updating a reservation table 119. Accordingly, based on a determined schedule, a path selector 121 may select an appropriate path to a storage device to improve performance of one or more data transfers within the system 100.

The storage server 104 may be operatively coupled to one or more storage devices 108-111 via an interface 107. In one embodiment, the interface 107 may include a host bus adapter (HBA). The HBA may be a circuit board and/or integrated circuit adapter that provides input/output (I/O) processing and physical connectivity between the storage server 104, and storage devices 108-111. In one embodiment, the HBA (e.g. interface) may include a processor to perform one or more operations as described herein. Storage devices 108-111 may be implemented locally (e.g., single node operating environment) or remotely (e.g., multi-node operating environment), and may communicate with the storage server 104 (e.g. storage controller 105) via one or more data transfer paths 120-121, which may be any suitable bus and/or a network. In one embodiment, the data transfer paths 120-121 may include a SAS connector. In addition, in one embodiment, the one or more data transfer paths 120-121 may be coupled to the storage server 104 via one or more ports 125-126 of the interface 107 and/or storage server 104. In addition, in some embodiments, the data transfer paths 120-121 may include one or more additions components (not shown) such as Serial Attached SCSI Expanders (SAS Expanders) to facilitate communication between large numbers of devices. The SAS Expanders may include, for example, edge expanders, and/or fanout expanders.

The storage devices 108-111 may also be implemented using any suitable technology such as magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage devices 108-111 may also be a combination of such devices. In one embodiment, storage devices 108-111 may be organized into one or more volumes of Redundant Array of Inexpensive Disks (RAID). For example, the storage devices 108-111 may include technology such as a hard-disk drive (HDDs) or a solid-state drive (SSD), or a combination thereof. It should be noted that storage server 104 may be located at a client site and utilized by a client such as an enterprise or corporation, where the storage server 104 may be provided by a storage provider or vendor such as EMC Corporation.

Accordingly, the system 100 may perform one or more processes to select a path and schedule for data transfers as further described herein.

As described above, improving performance of a storage system (e.g. SAS bus utilization) may include selecting an appropriate path and selecting an efficient scheduling of data transfers, which may decrease latency, improve utilization, and improve overall system throughput. For example, merely selecting a path (e.g. one of paths 120-121) to a storage device (e.g. one of storage devices 108-111) and picking the one with the least amount of pending input/output (I/O) traffic would potentially provide an improvement over traditional configurations. However, such a technique may result in inefficiencies due to the unpredictably of latency. For example, some I/O requests may take seconds to occur while others occur in mere microseconds. Accordingly, the system described herein may account for these variables to improve the overall usage of available bandwidth.

As described, latency and bandwidth (or transfer speed) of a given I/O may be estimated by factoring in the known performance characteristics (e.g. seek time for HDDs) of a storage device and its location within a topology (e.g. SAS topology). SSDs typically do not have latency issues on random-reads like HDDs, but have other limitations for digesting inbound writes for long term storage. Accordingly, for both HDDs and SSDs, these factors can be identified concisely in a performance table that allows for a calculation of expected I/O completion times.

Accordingly, the system may predict a latency for each incoming I/O request by calculating the expected start-of-transfer (e.g. STT) time along with its duration (transfer size/one-lane bandwidth speed) based on its performance table information. This start-time plus duration may form the basis of the scheduling that is used to select an appropriate data transfer path. For example, for each path, the first-fit and future-fit schedule is determined so that a selection between paths may be determined.

For example, to provide context, the above scenario may be analogized to the role of the host of a restaurant with plenty of tables but a shortage of wait staff. Reservations must be taken strategically because a customer that can be seated at a particular time may not be able to be served as readily. For example, for a customer reservation inquiry the host may factor in the size of the party and the likely number of tables that will be occupied by others at the requested arrival time. Accordingly, for each reservation request, the host may suggest to the customer the best time to arrive. For example, a host referencing a reservation book at 6:05 PM may have two pages open in the reservation book including the page for 6 PM and for the following hour at 7 PM. Accordingly, this allows the host to see what tables are occupied and who will be arriving in the next 60 minutes.

Similarly, in one embodiment, the system described herein may handle reservations in an efficient manner. For example, in one implementation, the system may relate to the analogy of a restaurant host described above to directly index into the reservation table (e.g. reservation book) yielding a fast O(1) complexity lookup with a modest 50% space overhead cost. It should be noted that the analogy of a restaurant host referred to herein is merely to provide context for some aspects of the disclosure, and should not be construed as limiting embodiments in any manner.

Figure 2:
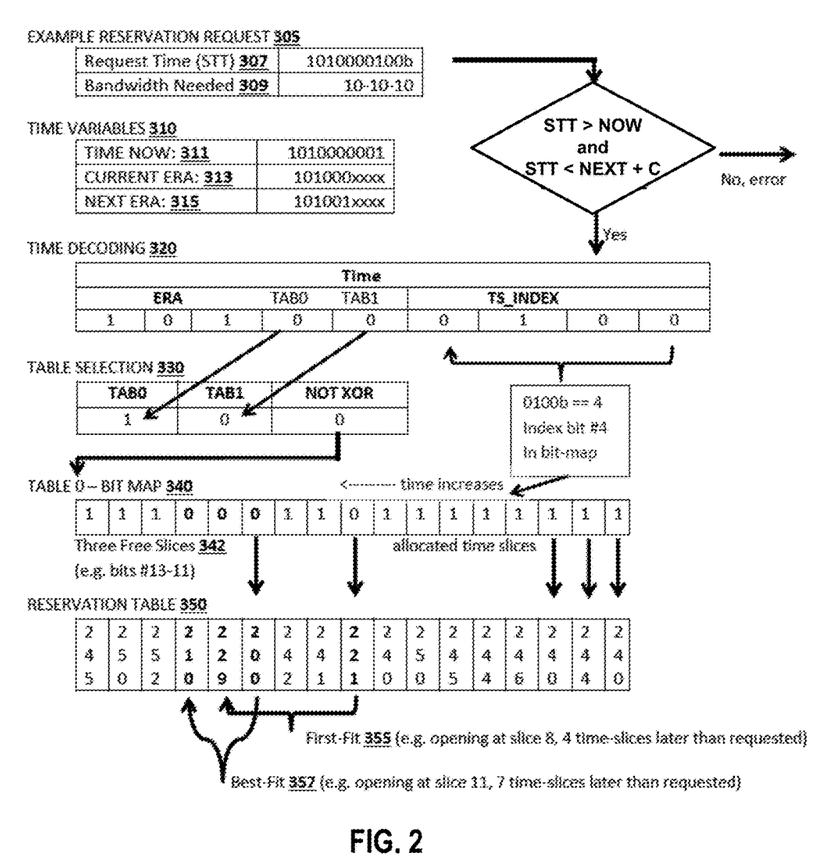
FIG. 2 is an example flow diagram for using a reservation table for scheduling a data transfer according to an embodiment of the disclosure.

An example process flow diagram for using a reservation table according to an embodiment of the disclosure is described below and with reference to FIG. 2. In addition, additional aspects of the process flow of FIG. 2 will be further clarified as discussed below with reference to FIGS. 3-5.

In one embodiment, the system may use two fixed-size reservation tables as part of a table selection 330. For example, the table may include table 0 and table 1 containing C number of time slices that are allocated for each path root (e.g. SAS ports 125 and 126). These tables may be allocated once and re-used repeatedly. The time span of C time-slices may be sufficiently large such that the expected start-time and duration of an individual transfers will not exceed that length of one of these tables, and accordingly, only two tables need be maintained at a time, per-port. For example, in one embodiment, the system may measure time in 1 millisecond intervals (the Linux "Jiffy" value) and may select C as 1024 to subdivide the table into 1024 time slices of one millisecond each (C). This will allow the system to use the bottom 10 bits of the system time in Jiffies as an index directly into these arrays. The system may perform a time decoding 320. In one embodiment, the two lowest bits of the ERA may be used to select between table 0 and table 1 in an alternating fashion by an exclusive OR operation on the two tables, and performing a NOT operation for the output (e.g. as part of table selection 330). In addition, the system may also maintain time variables 310 including time now 311, current era 313 (e.g. Current), and next era 315 (e.g. Next). Current may include the top 54 bits of the current time (referred to as an "era" herein) and Next may be set to Current+C (e.g. the system may store is all 64 bits of the time in these variables, but only the top 54 bits are relevant).

Similar to restaurant host analogy, with each reservation request the system may check the time, and if that equals or exceeds the value of Next, the system may skip forward in the reservation table. For example, the prior current table may be cleared as entries in the prior Current table have lapsed. The system may then set Current to Next and set Next to Current+C. Also, when processing a request to add a reservation, the system may check if the STT (e.g. request start time 307) is in the Current or Next eras before proceeding.

The system may also use the same technique for retrieving values in the reservation table and recording a reservation. For example, the STT may be calculated, which may be an absolute time value, based on the current TIME-NOW plus the estimated latency to start of transfer. In addition, the era may be determined as (STT & !(C−1)) (the top 54 bits of a 64 bit word) and the index in that reservation table as (STT & (C−1)), yielding the bottom 10 bits which may be a number ranging from 0-1023 that the system may use to index into the reservation tables. The system may also verify that the STT era is in the Current or Next table eras. This check would be similar to the restaurant host receiving a request for 15 minutes after the hour and responding back inquiring with respect to which hour to take a reservation. For example, the "era" of the reservation book of the host may be the day and hour, and the host may only be accepting last moment reservations for 6 pm and 7 pm, indexed by the minute.

In addition, to simplify calculations, the amount of data that the system may send over a given path for the specified amount of time may be defined as a "Bandwidth Unit" (BU). For example, if the system is using 1-millisecond TSs, on the SAS-2 bus (2400 MB/sec), the system may select a bandwidth unit of 10 KB, and that would indicate that a TS could contain a maximum of 240 BU per TS, and allows the system to fit that number into a byte and use 8-bit (1 byte) math. In addition, this number may be reduced for a particular path in the event that its speed is degraded.

Referring back to FIG. 2, as shown, the system may maintain a request time (STT) 307 and the required bandwidth (or bandwidth needed 309). For example, for reservation request 305, the system may transfer of 30 KB to a device in three 10 KB bandwidth units (e.g. bandwidth needed 309). In addition, for this example, the system may only use the bottom 4 bits for the TS-index into a 16 element reservation table, and the top 6 bits for the era, for three 10 bandwidth units, at time 324 (e.g. binary 10100101, or bits numbered 0-9 right to left).

Continuing with our above example of making a reservation at time 324 for 10 BUs over three TSs, the system could directly index into the reservation table 350 and determine if there are three consecutive time slices (e.g. three free slices 342) that can hold another 10 BUs each. The system may then simply return the start time and duration to the requestor to make its higher level decision. However, to further increase efficiency, the system may first check a reservation bit-map 340.

In one embodiment, each reservation table 350 may have a parallel structure referred to as a reservation bit-map (or bit-map) 340. For each time-slice the system may use one-bit in the bit-map to determine if that BU is fully-allocated (e.g. equal to or greater than 240 in the above example). This makes checking the reservation requests a trivial task. For example, a zero bit in the bit-map means that the TS has room for more allocations. Accordingly, bit arrays may be searched efficiently using specialized instruction sets (e.g. Intel Bit Manipulation Instructions) and the system may efficiently scan forward and find available positions of varying lengths in the schedule.

In addition, to simplify the calculation even further, the system may intentionally set the max BU per TS low by half of the average reservation request size. This allows the system to assign an allocation to a TS marked available regardless of its fullness and disregard the consequence of slightly under-filling or overfilling a TS as these will average out over time. For instance, using the above example, if the average transfer in BUs was 20, the system may reduce the max BU per TS by 10 (e.g. 230 in the above example). The system may also skip the final update to the table when the capacity is exceeded, and set the bit in the bit-map indicating that a particular time slice is full.

Figure 3:
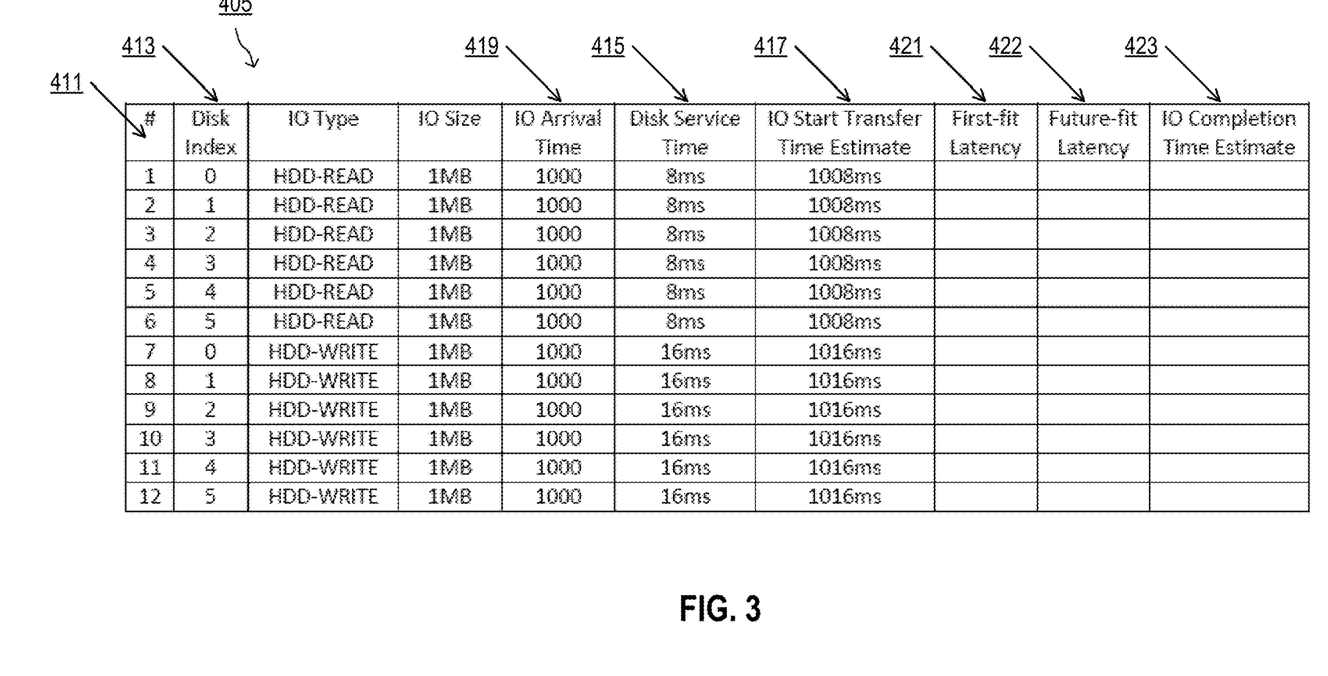
FIG. 3 shows an example structure of a reservation table according to an embodiment of the disclosure.
Figure 4:
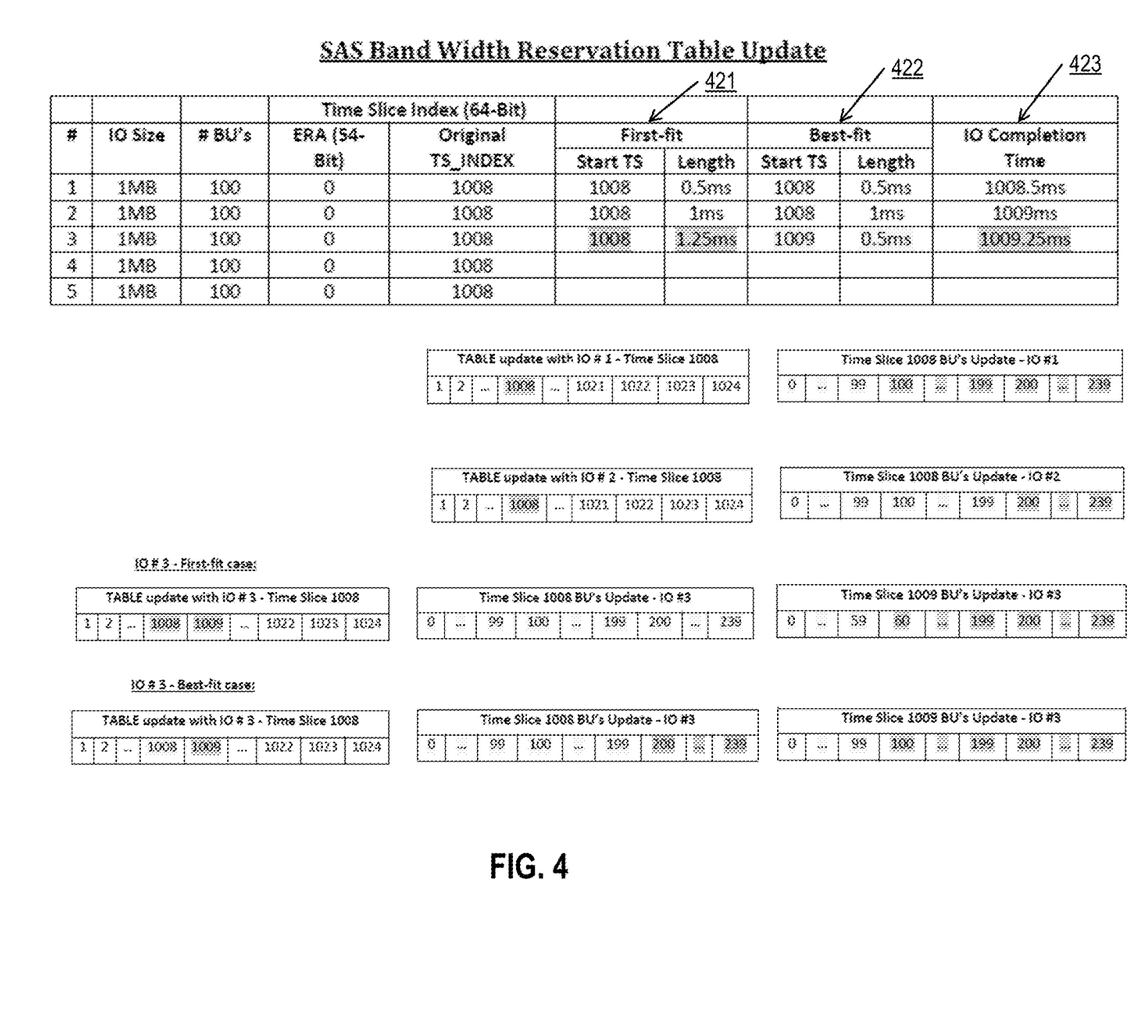
FIG. 4 shows an example of a reservation table update according to an embodiment of the disclosure.

FIG. 3 shows an example structure of a reservation table according to an embodiment of the disclosure. As shown, the Reservation Table 405 (or table) may be updated in a scenario with 12 outstanding IOs (or I/Os) that are identified with an IO Index 411. As shown, the IOs may be from 5 disks based on a Disk Index 413, and these disks may be connected to the storage server (e.g. HBA). As shown, the table may include a Disk Service Time 415 that may be the sum of a disk seek time and the latency at the disk due to a prior outstanding IO. An IO Start Transfer Time Estimate 417 may provide the time when the drive is ready to transfer the IO requested, and may be derived from the sum of IO Arrival Time 419 and Disk Service Time 415. As further described herein and as shown in FIG. 4, the First-fit Latency 421 may provide the estimated latency obtained during the reservation table update, and may correspond to the earliest possibly fragmented fit for the IO in the Reservation Table 405. The Future-fit Latency 422 (or Best-Fit) may provide the estimated latency obtained during the reservation table update, and may correspond to the earliest contiguous fit for the IO in the Reservation Table 405. The IO Completion Time Estimate 423 may provide the estimated IO completion time after accounting for the IO Start Transfer Time Estimate 417 and selecting either First-fit 421 or Future-fit 422, whichever is appropriate for the particular IO (or I/O). In one embodiment, the selection may be based on which of the First-fit 421 or Future-fit 422 has the earliest completion time.

Accordingly, for each incoming IO, the system may compute the IO Start Transfer Time Estimate 417 based on the disk seek time as shown above and then use this IO Start Transfer Time to update the Reservation Table 405.

Figure 5:
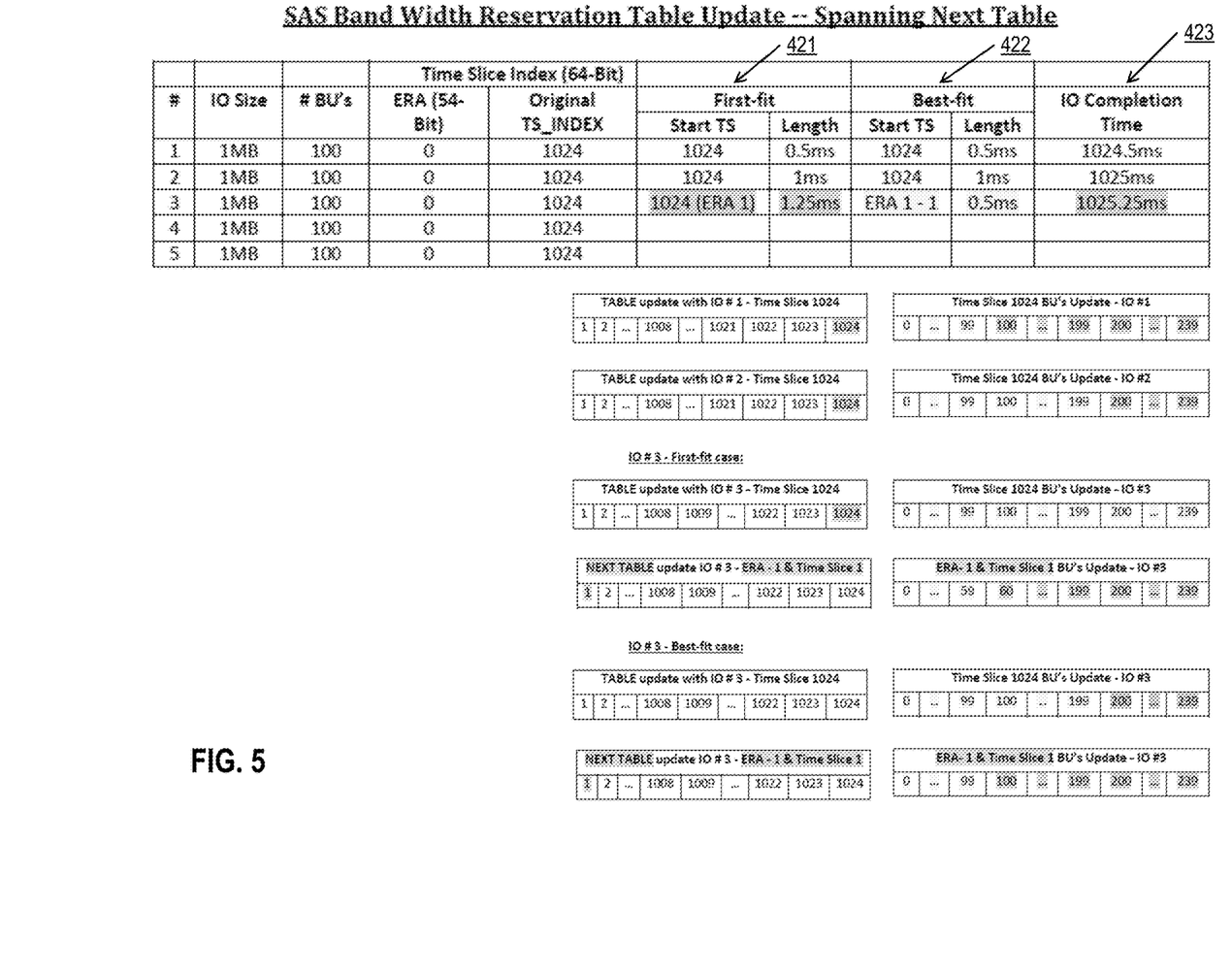
FIG. 5 shows an example of a reservation table update spanning a next table according to an embodiment of the disclosure.

FIGS. 4 and 5 show examples of a reservation table update according to an embodiment of the disclosure. As shown, the system may update the reservation table for the IO and select the first-fit 421 schedule or future-fit (or best-fit) 422 schedule based on the total IO Completion Time 423.

After completing the updates and selection as shown in the examples of FIGS. 4 and 5, the requestor may be returned two reservation request bit array fragments, each with a start time and length. For example, one array may contain the earliest possibly fragmented fit (e.g. First-fit 421) and the second array may contain, if found, the earliest contiguous fit (e.g. Future-fit 422). The system can then select whether an earlier though fragment fit is desired, or whether it may be worth postponing the transfer to receive a contiguous fit (e.g. consecutive allocation).

The system may generally evaluate the difference between the requested time and duration and any delay beyond what was requested is referred to as "impact," and generally the lowest impact path will be the appropriate choice when selecting between multiple alternatives. For example, RAID full-stripe reads and writes are often best held off briefly so they can receive a contiguous allocation. This allows small IOs, typically reads, to move ahead in the queue and fill in gaps improving bandwidth utilization. Similarly, SSD transfers can be fitted into immediate openings in the schedule since they can be performed with such low latencies.

Once a path is selected, the original request still containing its first-fit and future-fit alternative bit arrays is returned with its selection. The system may then use a start-time and bit array to find the reservation table entries to update by adding the specified number of BUs to each array cell with simple addition. If the sum of the addition exceeds the MAX BUs per TS value, then the TS is now deemed full and the reservation bit-index is updated accordingly.

In one embodiment, no update is made to the reservation table on completion of a request. Once an I/O has completed the system may go back and update the table, but because both SSDs and HDDs perform their completions out-of-order the system cannot release the later reservation for an I/O that completes early because that time slot may still be used by another I/O request to that device that is still pending Like the restaurant host analogy, in one embodiment, completed reservations and parties that leave early are of no consequence, only the inflow of new reservations are of significance to the system.

Figure 6:
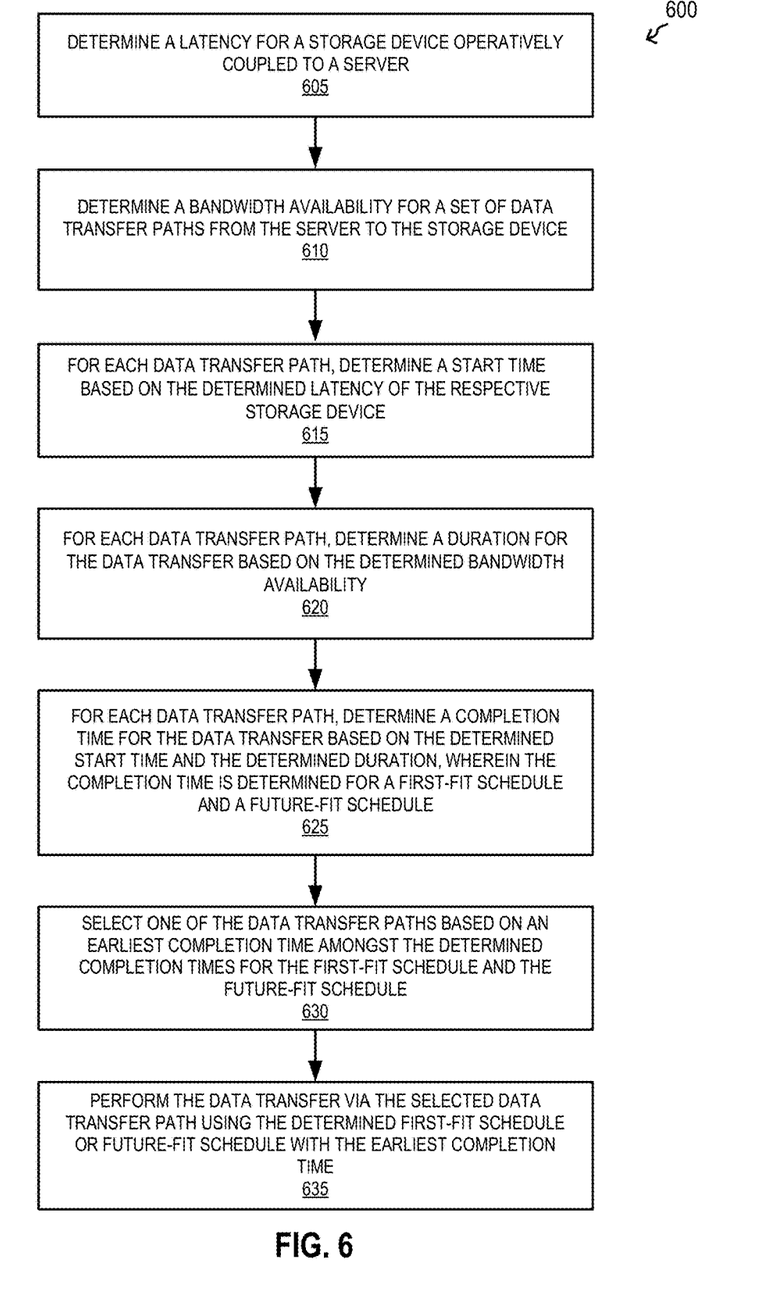
FIG. 6 is an example flow diagram illustrating a method of selecting a path and scheduling a data transfer according to an embodiment of the disclosure.

FIG. 6 is an example flow diagram illustrating a method of selecting a path and scheduling a data transfer according to an embodiment of the disclosure. Process 600 may use processing logic, which may include software, hardware, or a combination thereof. For example, process 600 may be performed by a system (e.g. system 100, storage server 104, or storage controller 105).

In 605, the system may determine a latency for a storage device operatively coupled to a server (e.g. storage server 104). In 610, the system may determine a bandwidth availability for a set of data transfer paths (e.g. paths 120-121) from the server to the storage device. In 615, for each data transfer path, the system may determine a start time (e.g. IO Start Transfer Time Estimate 417) based on the determined latency (e.g. Disk Service Time 415) of a respective storage device.

In 620, for each data transfer path, the system may determine a duration for the data transfer based on the determined bandwidth availability. In 625, for each data transfer path, the system may determine a completion time (e.g. IO Completion Time Estimate 423) for the data transfer based on the determined start time and the determined duration. In one embodiment, the completion time may be determined for a first-fit (e.g. first-fit 421) schedule and a future-fit (e.g. future-fit 422) schedule.

In 630, the system may select one of the data transfer paths based on an earliest completion time amongst the determined completion times for the first-fit schedule and the future-fit schedule. In one embodiment, the determined completion time for the first-fit schedule and the future-fit schedule may be based on a reservation table including time slices of the bandwidth availability. In one embodiment, the bandwidth availability may be represented as bandwidth units (e.g. BU). In one embodiment, the reservation table may reference a first table corresponding to a current era, and a second table corresponding to a next era. In one embodiment, the reservation table may be represented as a bit-map (e.g. bit-map 340). In 635, the system may perform the data transfer via the selected data transfer path using the determined first-fit schedule or future-fit schedule with the earliest completion time.

It should be noted that there may be variations to the flow diagrams or operations (or steps) described therein without departing from the embodiments described herein. For example, the operations may be performed in parallel, simultaneously, a differing order, or operations may be added, deleted, or modified.

Figure 7:
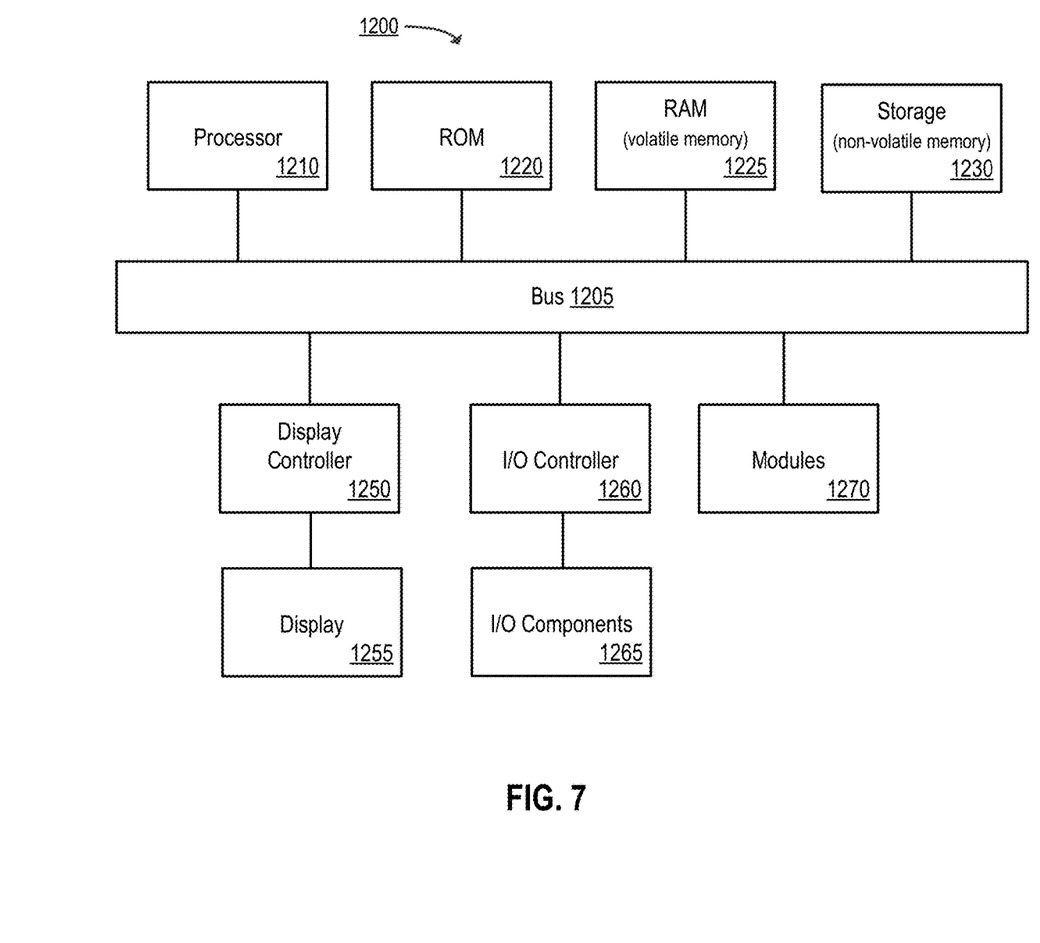
FIG. 7 is a block diagram illustrating an example computing system, which may be used in conjunction with one or more of the embodiments of the disclosure.

FIG. 7 is a block diagram illustrating an example computing system, which may be used in conjunction with one or more of the embodiments of the disclosure. For example, computing system 1200 (or system, or computing device, or device) may represent any of the systems (e.g. system 100), or devices described herein (e.g. storage server 104, storage controller 105, interface 107, storage device 108-111, or client device 101-102) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium (or computer-readable medium, or storage) containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the modules described above, such as, for example, storage controller 105, scheduler 118, and path selector 121 (and related modules, and sub-modules). Modules 1270 may reside, completely or at least partially, within the memories described above, or within a processor during execution thereof by the computing system. In addition, modules 1270 can be implemented as software, firmware, or functional circuitry within the computing system, or as combinations thereof.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory computer-readable medium storing instructions which, when executed by one or more processors of a computing device, cause the computing device to perform operations comprising:
   determining a latency for a storage device operatively coupled to a server;
   determining a bandwidth availability for a set of data transfer paths from the server to the storage device; and
   for each data transfer path, determining
      a start time based on the determined latency of a respective storage device,
      a duration for the data transfer based on the determined bandwidth availability, and
      a completion time for the data transfer based on the determined start time and the determined duration, wherein the completion time is determined for a first-fit schedule and a future-fit schedule, wherein the first-fit schedule represents an earliest fragmented fit, and wherein the future-fit schedule represents an earliest contiguous fit,
   selecting one of the data transfer paths based on an earliest completion time amongst the determined completion times for the first-fit schedule and the future-fit schedule; and
   performing the data transfer via the selected data transfer path using the determined first-fit schedule or future-fit schedule having the earliest completion time.

2. The medium of claim 1, wherein the determined completion time for the first-fit schedule and the future-fit schedule is based on a reservation table including time slices of the bandwidth availability.

3. The medium of claim 2, wherein the bandwidth availability is represented as bandwidth units.

4. The medium of claim 2, wherein the first-fit schedule is based on the earliest fragmented fit for the data transfer within the reservation table.

5. The medium of claim 2, wherein the future-fit schedule is based on the earliest contiguous fit for the data transfer within the reservation table.

6. The medium of claim 2, wherein the reservation table is represented as a bit-map.

7. The medium of claim 2, wherein each of the time slices of the reservation table represent an interval corresponding to a Jiffy value.

8. The medium of claim 2, the reservation table references a first table corresponding to a current era, and a second table corresponding to a next era.

9. A system, comprising:
   a memory storing instructions; and a processor coupled to the engine and the memory to execute the instructions from the memory, the processor being configured to perform operations, the operations comprising:
    determining a latency for a storage device operatively coupled to the system;
    determining a bandwidth availability for a set of data transfer paths from the system to the storage device; and
    for each data transfer path, determining
        a start time based on the determined latency of a respective storage device,
        a duration for the data transfer based on the determined bandwidth availability, and
        a completion time for the data transfer based on the determined start time and the determined duration, wherein the completion time is determined for a first-fit schedule and a future-fit schedule, wherein the first-fit schedule represents an earliest fragmented fit, and wherein the future-fit schedule represents an earliest contiguous fit;
    selecting one of the data transfer paths based on an earliest completion time amongst the determined completion times for the first-fit schedule and the future-fit schedule; and
    performing the data transfer via the selected data transfer path using the determined first-fit schedule or future-fit schedule having the earliest completion time.

10. The system of claim 9, wherein the determined completion time for the first-fit schedule and the future-fit schedule is based on a reservation table including time slices of the bandwidth availability.

11. The system of claim 10, wherein the bandwidth availability is represented as bandwidth units.

12. The system of claim 10, wherein the first-fit schedule is based on the earliest fragmented fit for the data transfer within the reservation table.

13. The system of claim 10, wherein the future-fit schedule is based on the earliest contiguous fit for the data transfer within the reservation table.

14. The system of claim 10, wherein the reservation table is represented as a bit-map.

15. The system of claim 10, wherein each of the time slices of the reservation table represent an interval corresponding to a Jiffy value.

16. The system of claim 10, the reservation table references a first table corresponding to a current era, and a second table corresponding to a next era.

17. A method, comprising:
    determining a latency for a storage device operatively coupled to a server;
    determining a bandwidth availability for a set of data transfer paths from the server to the storage device; and
    for each data transfer path, determining
        a start time based on the determined latency of a respective storage device,
        a duration for the data transfer based on the determined bandwidth availability, and
        a completion time for the data transfer based on the determined start time and the determined duration, wherein the completion time is determined for a first-fit schedule and a future-fit schedule, wherein the first-fit schedule represents an earliest fragmented fit, and wherein the future-fit schedule represents an earliest contiguous fit;
    selecting one of the data transfer paths based on an earliest completion time amongst the determined completion times for the first-fit schedule and the future-fit schedule; and
    performing the data transfer via the selected data transfer path using the determined first-fit schedule or future-fit schedule having the earliest completion time.

18. The method of claim 17, wherein the determined completion time for the first-fit schedule and the future-fit schedule is based on a reservation table including time slices of the bandwidth availability.

19. The method of claim 18, wherein the bandwidth availability is represented as bandwidth units.

20. The method of claim 18, wherein the first-fit schedule is based on the earliest fragmented fit for the data transfer within the reservation table and the future-fit schedule is based on the earliest contiguous fit for the data transfer within the reservation table.

* * * * *